US012664901B2

(12) United States Patent
Naqvi

(10) Patent No.: US 12,664,901 B2
(45) Date of Patent: Jun. 23, 2026

(54) METHOD AND SYSTEM FOR SIMULATING AN AIRSPACE FOR AIR TRAFFIC MANAGEMENT

(71) Applicant: Raytheon Company, Arlington, VA (US)

(72) Inventor: Waseem Naqvi, Marlborough, MA (US)

(73) Assignee: Raytheon Company, Arlington, VA (US)

( * ) Notice: Subject to any disclaimer, the term of this patent is extended or adjusted under 35 U.S.C. 154(b) by 0 days.

(21) Appl. No.: 18/811,453

(22) Filed: Aug. 21, 2024

(65) Prior Publication Data

US 2026/0057790 A1 Feb. 26, 2026

(51) Int. Cl.
*G08G 5/57* (2025.01)
*G08G 5/22* (2025.01)
*G08G 5/55* (2025.01)
*G08G 5/56* (2025.01)
*G08G 5/59* (2025.01)

(52) U.S. Cl.
CPC ................ *G08G 5/56* (2025.01); *G08G 5/22* (2025.01); *G08G 5/55* (2025.01); *G08G 5/57* (2025.01); *G08G 5/59* (2025.01)

(58) Field of Classification Search
CPC .. G08G 5/56; G08G 5/22; G08G 5/55; G08G 5/57; G08G 5/59
See application file for complete search history.

(56) References Cited

U.S. PATENT DOCUMENTS

| | | | | |
|---|---|---|---|---|
| 6,606,553 B2 * | 8/2003 | Zobell | ...................... | G08G 5/76 701/122 |
| 9,558,670 B1 * | 1/2017 | Sheth | ...................... | G08G 5/55 |
| 12,248,327 B1 * | 3/2025 | Zhang | ...................... | G05D 1/46 |

(Continued)

FOREIGN PATENT DOCUMENTS

CN 116822362 A 9/2023

OTHER PUBLICATIONS

"Airspace types (United States)", (2025) Online. Wikipedia. Web. https://en.wikipedia.org/wiki/Airspace_types_(United_States)#:~:text=In%20the%20U.S.%2C%20airspace%20is,%22%20and%20%22other%20airspace%22 (herein after "Wikipedia"). (Year: 2025).*

*Primary Examiner* — Ashley L Redhead, Jr.
(74) *Attorney, Agent, or Firm* — Schwegman Lungberg & Woessner, P.A.

(57) ABSTRACT

Generally discussed herein are systems, apparatuses, and methods for simulating an airspace including a method that receives a plurality of flight intent data inputs from a plurality of sources including service suppliers of unmanned aircraft systems (UAS) traffic management (UTM), advanced air mobility (AAM) and conventional air traffic management (ATM). The plurality of flight intent data inputs include, UTM flight intent volumes, UTM flight intent trajectories, conventional flight plans, conventional flight trajectories and an airspace design configuration. The method includes generating a center line route corresponding to each of the plurality of flight intent data inputs; generating a flight volume for each the plurality of flight intent data inputs; generating a four-dimensional trajectory based upon the center line route and the flight volume; and verifying the four-dimensional trajectory against constraints and potential conflicts.

14 Claims, 7 Drawing Sheets

(56) References Cited

U.S. PATENT DOCUMENTS

| | | | | |
|---|---|---|---|---|
| 2008/0059052 | A1* | 3/2008 | Bui | G08G 5/56 701/120 |
| 2009/0105935 | A1* | 4/2009 | Jha | G08G 5/32 701/120 |
| 2012/0158219 | A1 | 6/2012 | Durling et al. | |
| 2012/0191333 | A1* | 7/2012 | Sawhill | G08G 5/53 701/122 |
| 2018/0181144 | A1* | 6/2018 | Steinmann | G05D 1/0022 |
| 2019/0340934 | A1 | 11/2019 | Villa et al. | |
| 2020/0058225 | A1* | 2/2020 | Heiberg | G08G 5/34 |
| 2020/0250993 | A1 | 8/2020 | Li et al. | |
| 2021/0183255 | A1 | 6/2021 | Van Tulder | |
| 2022/0351629 | A1* | 11/2022 | Pesquet-Popescu | G08G 5/55 |
| 2023/0112803 | A1* | 4/2023 | Herriot | G08G 5/21 701/415 |
| 2024/0161634 | A1 | 5/2024 | Faccin | |
| 2025/0093161 | A1* | 3/2025 | Magnuson | G01C 21/20 |
| 2025/0111791 | A1* | 4/2025 | Yalamanchi | G05D 1/2464 |
| 2025/0157342 | A1* | 5/2025 | Jenkins | G08G 5/55 |

* cited by examiner

METHOD AND SYSTEM FOR SIMULATING AN AIRSPACE FOR AIR TRAFFIC MANAGEMENT

TECHNICAL FIELD

Embodiments discussed herein generally relate to electronically implemented methods and systems for simulating an airspace for air traffic management including by generating four dimensional trajectories from unmanned aircraft systems (UAS) traffic management (UTM).

BACKGROUND

Unmanned aerial vehicles ("drones") are increasingly present in airspaces, particularly at low altitudes and in urban environments. Drones can be piloted by a remote operator or piloted autonomously. As such, drones may be far smaller than a piloted aircraft. This allows drones to be implemented as lower cost for various applications including package delivery, surveillance, etc.

Larger drones that may be used for applications such air taxis, shuttles or for regional cargo are also entering airspace. They may also be remotely piloted or be autonomous. These are commonly known in the industry as advanced air mobility (AAM) aircraft and will fly in lower airspace typically in the terminal maneuvering areas. Their autonomous traffic management and deconfliction is known as provider of services to urban air mobility (PSU).

In order to ensure the safety of drone navigation, it is necessary to deploy air traffic control that makes it possible to provide each drone with trajectories that do not contain any risks of striking obstacles. While conventional air traffic control systems are based on an air traffic controller supervising an airspace, such solutions are not feasible in controlling drones as human air traffic controllers are unable to analyze the air situation rapidly enough to propose safe trajectories to drones in a feasible amount of time. Thus, UTMs/PSUs for drones segregate airspace, so drones stay in their own airspace volumes.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments or examples discussed in the present document.

DETAILED DESCRIPTION

This disclosure generally relates to improvements in air traffic management particularly as it relates to simulating an airspace that includes not only conventional flight plans, conventional flight trajectories and an airspace design configuration but additionally unmanned aircraft systems (UAS) (drones) from service suppliers. One or more embodiments help in providing a more comprehensive and integrated air traffic management solution as discussed herein.

Currently, autonomous or remotely piloted aircraft of various types and operations are entering civil airspace. These next generation uncrewed aircraft systems (UAS) and vertical takeoff and landing (VTOL) aircraft will need to operate in the same congested airspace volumes as existing commercial operations. Current air traffic management approaches cannot scale to this new digital machine-to-machine interoperability and direction. New airspace design concepts are required to enable large scale operations.

The present application discloses systems and methods that enable safe, scalable and integrated operations within a congested airspace. The system and methods of the present application integrate unmanned aircraft systems (UAS) traffic management (UTM), advanced air mobility (AAM) and conventional air traffic management (ATM) to provide for an integrated traffic management solution. This should be contrasted with typical practice where UTM and UAM/AAM segregate airspace, so that unmanned aircraft stay in their own airspace volumes. The present application discloses systems and methods that simulate the airspace allowing for integration of various air traffic management providers.

Figure 1:
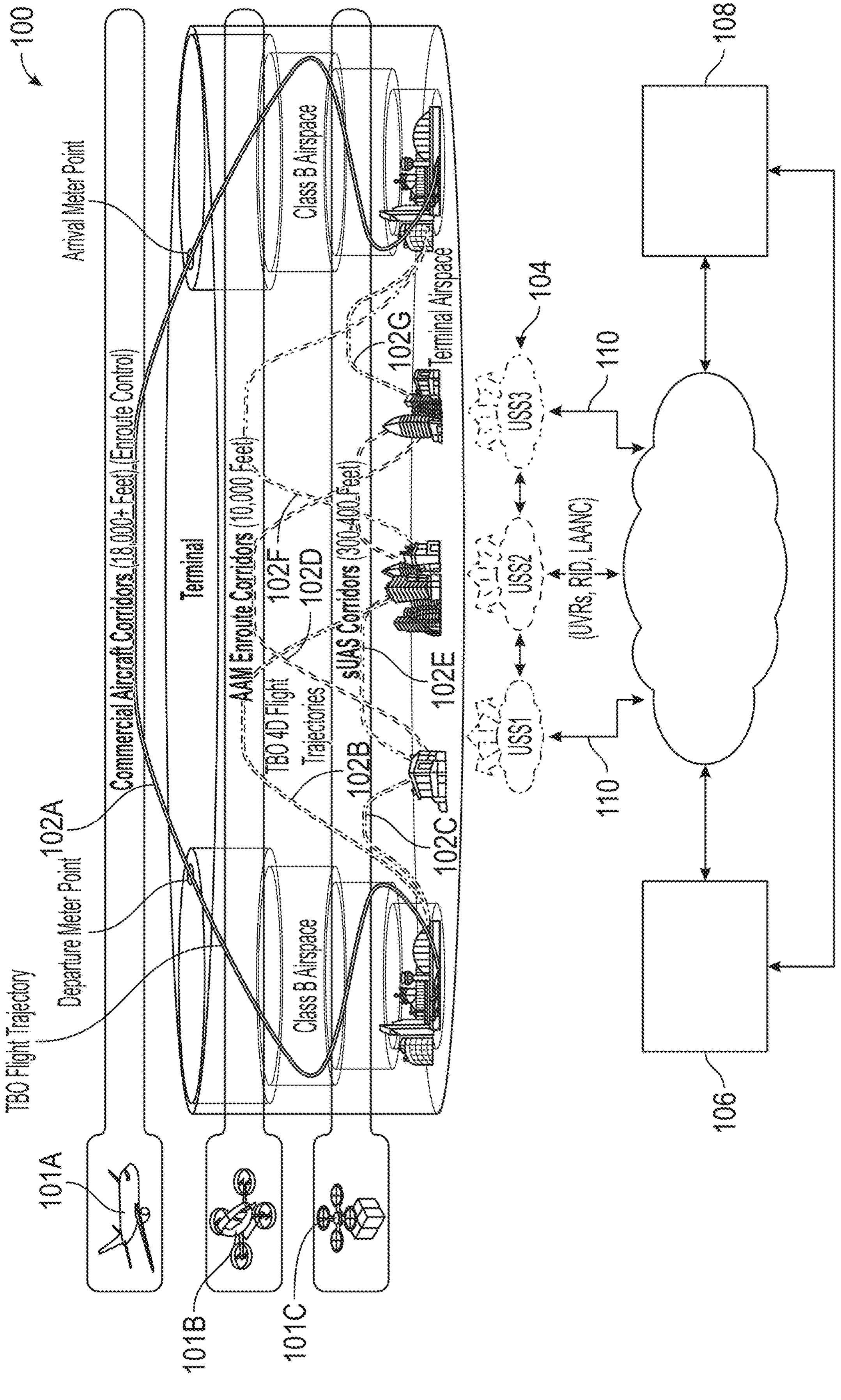
FIG. 1 illustrates, by way of example, a schematic diagram of an embodiment of a system for simulating an airspace for air traffic management.

FIG. 1 is a schematic diagram of an embodiment of a system 100. The system 100 can be used within an airspace containing both manned and unmanned aerial vehicles. The system can be implemented to control traffic within the airspace.

The airspace illustrated in FIG. 1 includes commercial aircraft corridors (also called airways herein) between cities or regions as well as intra-regional corridors (e.g., AAM enroute corridors) and intra-city corridors (e.g., sUAS corridors). The airspace can include manned aircraft 101A and UAVs (drones) 101B and 101C. The airspace includes illustrations of airspace classifications (e.g., class B) and four-dimensional flight trajectories 102A, 102B, 102C, 102D, 102D, 102E, 102F and 102G generated by the system 100. Some of the four-dimensional flight trajectories 102A, 102B, 102C, 102D, 102D, 102E, 102F and 102G that have been generated by the system 100 are implemented by service suppliers 104 (e.g., USS1, USS2, USS3, etc.) The system 100 can be electronically enabled having processing circuitry 106 (e.g., part of one or more networked computers, part of a server farm, etc.) and a memory 108 communicating using known communications modalities.

The system 100 can be configured to receive inputs 110 (e.g., sensor data, telemetry data, flight intent data inputs, etc.) from a plurality of sources including service suppliers 104 of unmanned aircraft systems (UAS) traffic management (UTM), advanced air mobility (AAM) and conventional air traffic management (ATM). Thus, the inputs 110 can include UTM flight intent volumes, UTM flight intent trajectories, conventional flight plans, conventional flight trajectories, sensor data, telemetry data and an airspace design configuration, etc. from service suppliers 104, pilots, the air traffic controller and/or other sources.

In generating the four-dimensional flight trajectories 102A, 102B, 102C, 102D, 102D, 102E, 102F and 102G, the system 100 can simulate the airspace. Thus, the system 100 can receive (via processing circuitry 106 and/or memory 108) inputs 110 including a plurality of flight intent data inputs from a plurality of sources including service suppliers of unmanned aircraft systems (UAS) traffic management (UTM), advanced air mobility (AAM) and conventional air traffic management (ATM). The system 100 can generate at least one four-dimensional trajectory (e.g., one or more of the plurality of four-dimensional flight trajectories 102A, 102B, 102C, 102D, 102D, 102E, 102F and 102G) by determining at least one center line route and determining at least one flight volume derived from at least one of the plurality of flight intent data inputs as further discussed herein. The system 100 can evaluate the at least one four-dimensional trajectory against constraints and for potential conflicts. The system 100 can notify one or more of the service suppliers if the at least one of the plurality of flight intent data inputs has been approved or disapproved by the system 100 based upon a potential conflict or a violation of one or more of the constraints. In some examples, the system 100 can verify (e.g., evaluate and notify) all of the plurality of flight intent data inputs as a plurality of four-dimensional trajectories (e.g., all of the four-dimensional flight trajectories 102A, 102B, 102C, 102D, 102D, 102E, 102F and 102G). Thus, the system 100 can achieve a robust, comprehensive and integrated simulation of the airspace depicted in FIG. 1.

The airspace is controlled by or aided by output of the system 100. Such control can be either direct or indirect via the service suppliers and air traffic control. Thus, the system 100 can act as UTM, when the aircraft being controlled are or include UAVs. The system 100 acting as UTM can generate and optimize the four-dimensional trajectories 102A, 102B, 102C, 102D, 102D, 102E, 102F and 102G of the aircraft, notably UAVs 101B and 101C, so that they do not present any danger. Additionally, the system 100 can optimize other parameters such as journey time or fuel consumption, and can ensure that the aircraft in the airspace correctly follow the four-dimensional trajectories 102A, 102B, 102C, 102D, 102D, 102E, 102F and 102G. Thus, the system 100 can include verifying that the four-dimensional trajectories 102A, 102B, 102C, 102D, 102D, 102E, 102F and 102G do not present any danger by insuring such four-dimensional trajectories 102A, 102B, 102C, 102D, 102D, 102E, 102F and 102G do not come into contact with one another, are not unacceptably close in proximity/time and do not violate any constraints discussed above.

The processing circuitry 106 can in electronic communication with various components of the including the system 100 including the memory 108 and aspects of the airspace including the service suppliers 104. The processing circuitry 106 receives one or more signals from vehicles within the airspace, the service suppliers 104, etc. Data used by the system 100 may be gathered and processed substantially continuously. Further, information can be stored in the memory 108 associated with the processing circuitry 106. The processing circuitry 106 and memory 108 can be referred to as a non-transitory computer readable storage device, herein.

The system 100 can include, for example, software, hardware, and combinations of hardware and software configured to execute several functions related to, among others, management of air traffic within the airspace. The processing circuitry 106 can be an analog, digital, or combination analog and digital controller including a number of components. As examples, the processing circuitry 106 can include integrated circuit boards or ICB(s), printed circuit boards PCB(s), processor(s), data storage devices, switches, relays, or any other components. Examples of processors can include any one or more of a microprocessor, a controller, a digital signal processor (DSP), an application specific integrated circuit (ASIC), a field-programmable gate array (FPGA), or equivalent discrete or integrated logic circuitry. Commercially available microprocessors can be configured to perform the functions of the processing circuitry 106. Various known circuits may be associated with processing circuitry 106, including power supply circuitry, signal-conditioning circuitry, actuator driver circuitry (i.e., circuitry powering solenoids, motors, or piezo actuators), and communication circuitry. In some examples, the processing circuitry 106 or other aspects of the system 100 may be cloud based.

The memory 108 may include storage media to store and/or retrieve data or other information such as, for example, inputs 110 as discussed above. Inputs 110 can be provided by service suppliers 104 but can also include sensor data, telemetry data and flight-plan data can be accessed from flight plans logged with the FAA, ICAO, DOD or other applicable agency and can include information about intended route, altitude, aircraft type, and other relevant details.

Storage devices (e.g., memory 108), in some examples can be a computer-readable storage medium. The data storage devices can be used to store program instructions for execution by processor(s) of the processing circuitry 106, for example. The storage devices, for example, are used by software, applications, algorithms, as examples, running on and/or executed by the processing circuitry 106. The storage devices can include short-term and/or long-term memory and can be volatile and/or non-volatile. Examples of non-volatile storage elements include magnetic hard discs, optical discs, floppy discs, flash memories, or forms of electrically programmable memories (EPROM) or electrically erasable and programmable (EEPROM) memories. Examples of volatile memories include random access memories (RAM), dynamic random-access memories (DRAM), static random-access memories (SRAM), and other forms of volatile memories known in the art.

The airspace of FIG. 1 has an airspace design configuration that includes airspace classes and airway corridors. This information can be one of the inputs 110 into the system 100. Additionally, the airspace includes various constraints. These constraints are aircraft-based and environmental. As an example, the aircraft-based constraints can include carrier specific constraints (e.g., based upon an airline procedure model or manual) and aircraft based (e.g., based upon an aircraft performance model). The aircraft performance model can include drag, lift, weight, thrust, fuel consumption, motion data and operation data including a phase of flight. Further examples of constraints include objects within the airspace such as buildings, other geographic flight restrictions, temporary flight restrictions and weather conditions. Prevailing weather conditions can be obtained from the National Weather Service or other reputable sources and can include wind speed, wind direction, temperature, air pressure, visibility, cloud cover, presence of precipitation, turbulence, etc. Constraints can additionally include air space status such as number of planes in the airspace, status/phase of such planes (e.g., takeoff, descent to landing, holding, cruising), altitudes, plane status and other relevant information. Constraints and/or conflicts can include adhering to applicable safety, regulatory and other rules such as applicable checklists, governing regulation, airspace restrictions, and the like. The system 100 can be configured to perform conflict detection (e.g., determination if four-dimensional trajectories intersect or are unacceptably close in proximity and time) and operational logic review using a rules base and contextual data (e.g., inputs 110, location, plane type, altitude, weather conditions, status/phase: clearance, request, confirmation, report, etc.).

According to some examples, the system 100 can evaluate the plurality of flight intent data inputs for the potential conflicts or violation of one or more constraints and can further notify (e.g., issue an alert) one or more of the service suppliers if one or more of the plurality of flight intent data inputs has been approved or disapproved based upon the potential conflicts or a violation of one or more of the constraints. The system 100 thus can issue an alert to one or more of the service suppliers if the one or more of the plurality of flight intent data inputs has been disapproved, can regenerate a second (or further) four-dimensional trajectory using a revised center line route and revised flight volume (discussed subsequently) and can reverify the second (or further) four-dimensional trajectory against constraints and potential conflicts.

Figure 2:
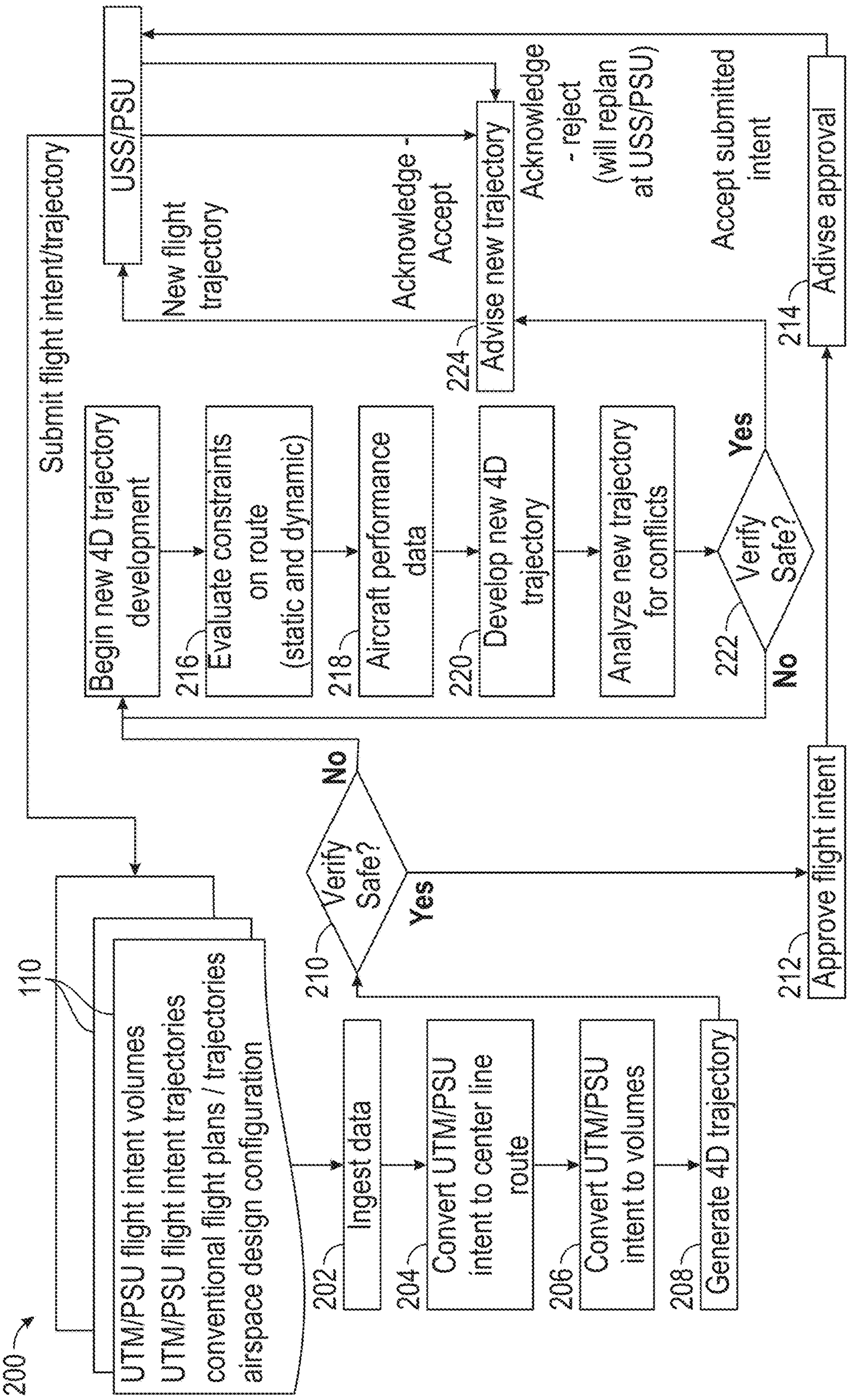
FIG. 2 illustrates, by way of example, a block diagram of an embodiment of a method for simulating an airspace for air traffic management.

FIG. 2 shows a flow diagram of a method 200 of simulating an airspace for air traffic management. The method 200 can be implemented using the system 100 discussed previously or another electronically networked system. The method 200 can receive 202 inputs 110 including the plurality of flight intent data inputs from a plurality of sources including service suppliers of unmanned aircraft systems (UAS) traffic management (UTM), advanced air mobility (AAM) and conventional air traffic management (ATM). The flight intent data inputs can include UTM flight intent volumes, UTM flight intent trajectories, conventional flight plans, conventional flight trajectories and an airspace design configuration. The method 200 can include generating 204, with the electronically networked system, a center line route corresponding to each of the plurality of flight intent data inputs. The method 200 can include generating 206, with the electronically networked system, a flight volume for each the plurality of flight intent data inputs. The method 200 can include generating 208, with the electronically networked system, a four-dimensional trajectory based upon the center line route and the flight volume (example discussed in FIG. 3). The method 200 can include verifying 210, with the electronically networked system, the four-dimensional trajectory against constraints and potential conflicts. If the verifying 210 is completed satisfactorily, the flight intent for the service supplier is approved 212 and the service supplier is advised 214 of such approval.

However, FIG. 2 further illustrates various steps of the method 200 for developing a second (new) four-dimensional trajectory if the verifying 210 determines a constraint or potential conflict has been violated. In the illustrated embodiment, this process can include evaluating 216 the constrains on route (examples discussed previously), reviewing or evaluating 218 aircraft performance data (discussed previously) and developing 220 the second (new) four-dimensional trajectory. The method 200 can include verifying 222, with the electronically networked system, the second (new) four-dimensional trajectory against constraints and potential conflicts. If the verifying 222 is completed satisfactorily, the service supplier is advised 224 that original intent was disapproved but that a new trajectory that avoids potential constraint(s) or potential conflict(s) has been generated.

Figure 3:
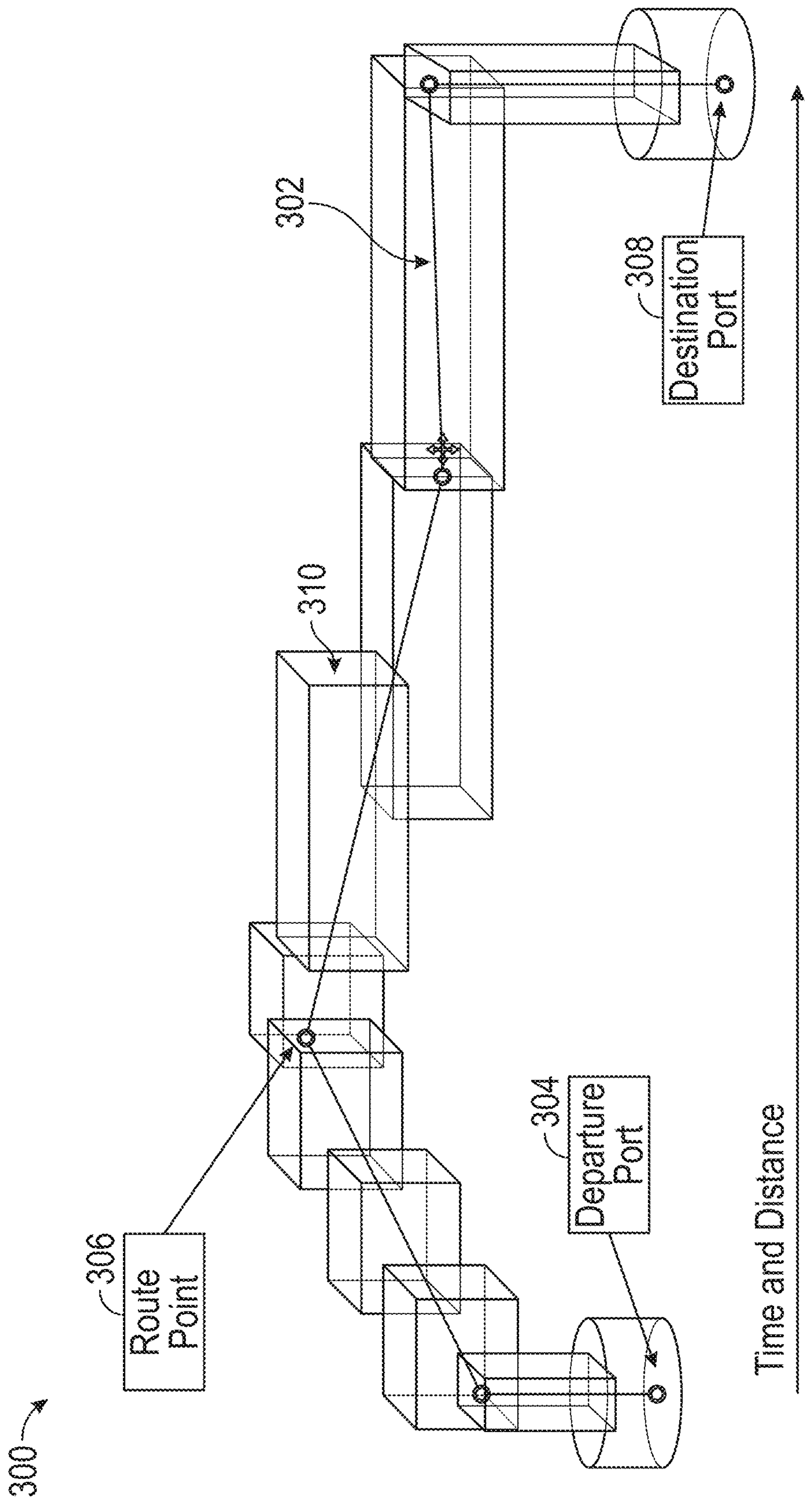
FIG. 3 illustrates, by way of example, a schematic diagram of an example four-dimensional trajectory generated by the system of FIG. 1 or the method of FIG. 2.

FIG. 3 illustrates the process of generating a four-dimensional trajectory 300 via generating at least one center line route 302. The center line route 302 can correspond to each (or at least one) of the plurality of flight intent data inputs discussed previously. The center line route 302 can include a departure port 304, various interconnected route points 306 and a destination port 308. The process of generating the four-dimensional trajectory 300 can additionally include generating at least one flight volume 310. The flight volume 310 can correspond to each (or at least one) of the plurality of flight intent data inputs discussed previously. The flight volume 310 can include various polygons of different shapes and sizes that are spaced together surrounding the center line route 302. The center line route 302 can bisect and/or pass through each of the polygons of the flight volume 310.

Figure 4A:
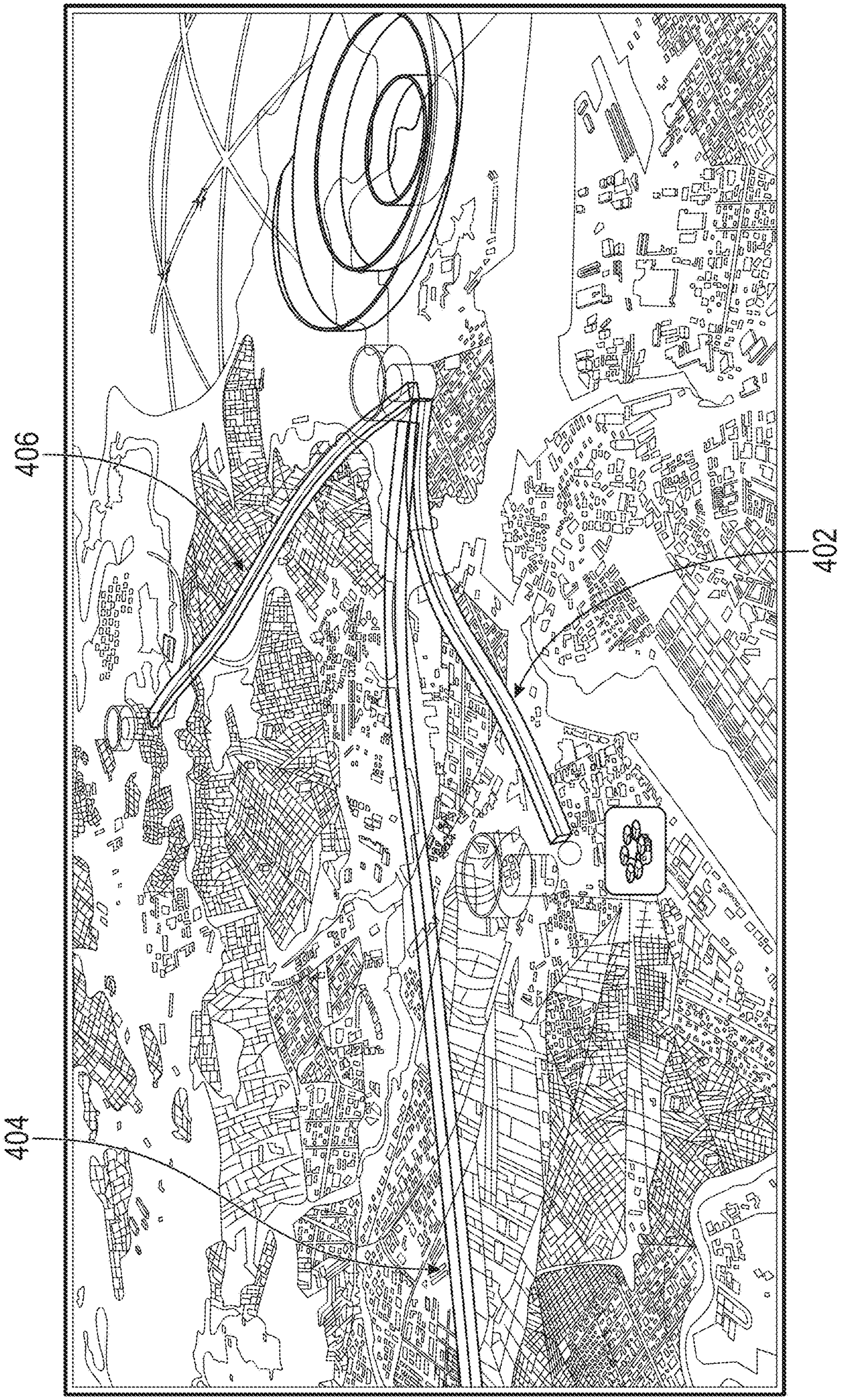
FIG. 4A illustrates, by way of example, a virtual simulation of an airspace having several four-dimensional trajectories generated by the system of FIG. 1 or the method of FIG. 2.

FIG. 4A shows an example of a simulation of an airspace that illustrates various four-dimensional trajectories 402, 404 and 406 generated by the system 100 (FIG. 1) or the method 200 (FIG. 2). The simulation of four-dimensional trajectories can be presented to a stakeholder (e.g., a drone operator of a service supplier, or an air navigation service provider (ANSP) that controls conventional and now new entrant aircraft) to facilitate control of unmanned aerial vehicle trajectory. FIG. 4A illustrates several four-dimensional trajectories 402, 404 and 406 that can be followed by different drones of the service supplier.

Figure 4B:
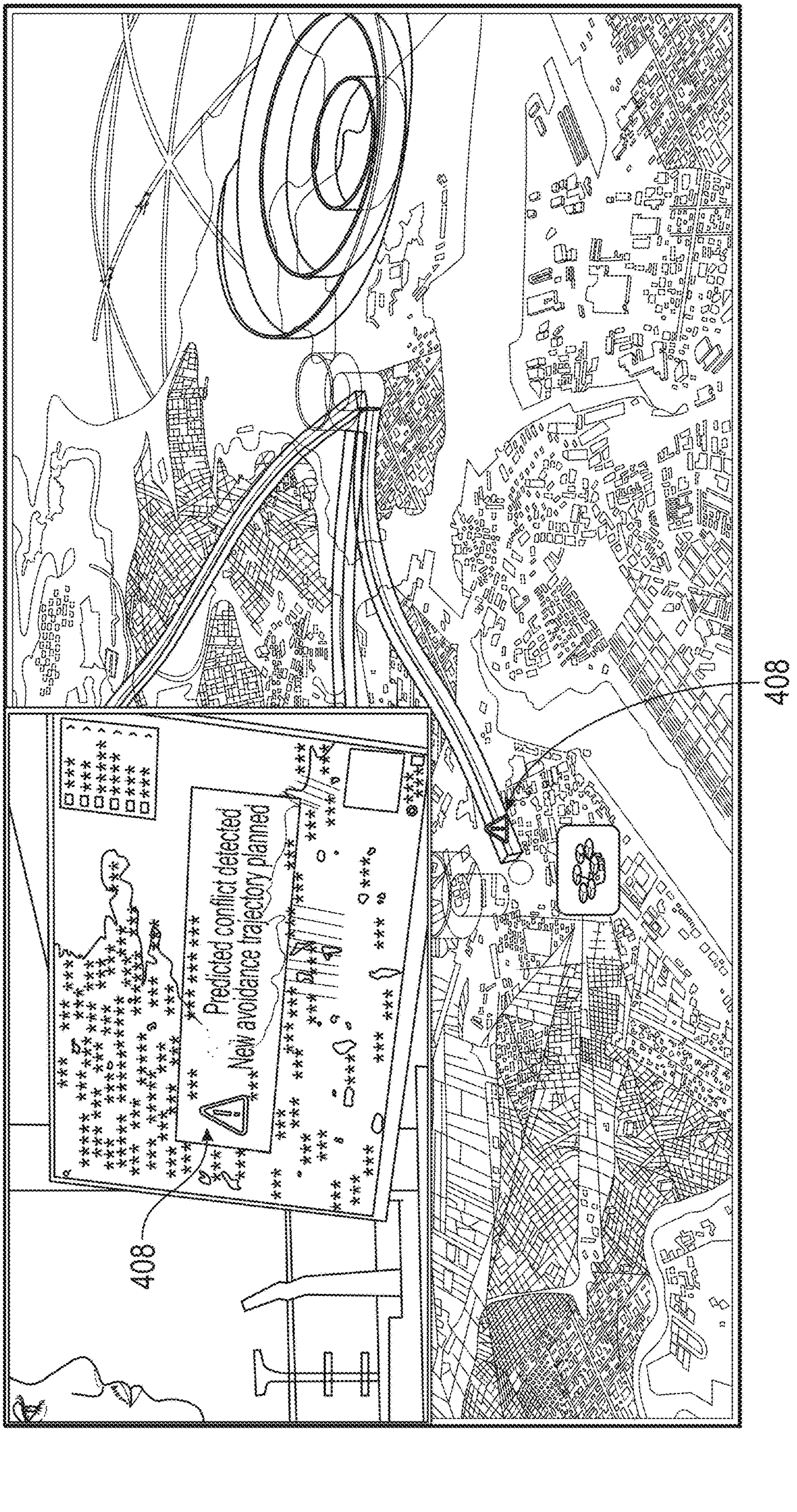
FIG. 4B illustrates an example of an alert issued by the system of FIG. 1 or the method of FIG. 2 due to a potential conflict identified with one of the four-dimensional trajectories of FIG. 4A.

FIG. 4B shows the simulation of the airspace of FIG. 4A but illustrating a process where an alert 408 has been issued to the operator or other personnel of the service supplier indicating that a potential conflict has been identified and a new avoidance trajectory has been planned to avoid the potential for conflict.

Figure 5A:
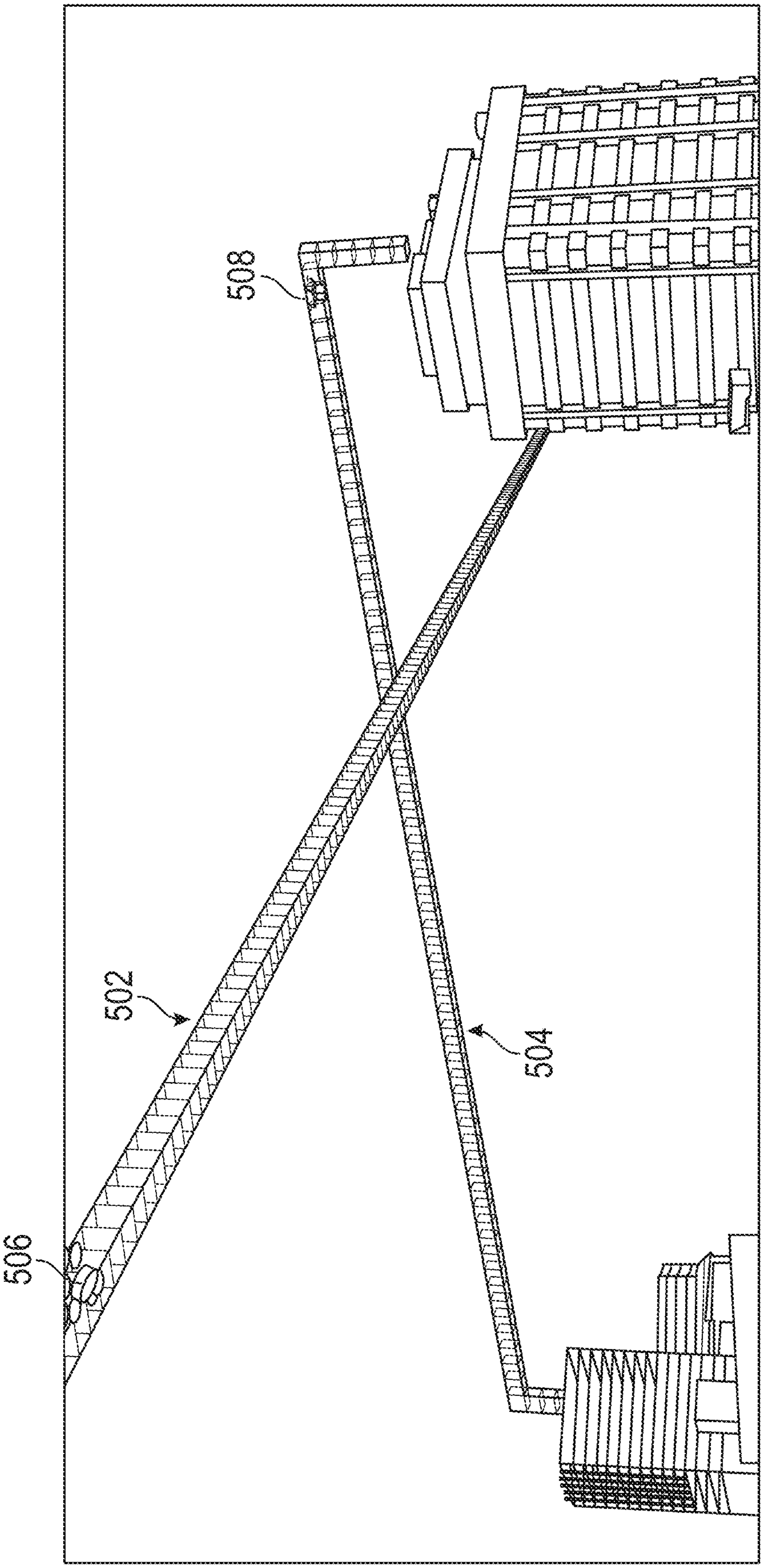
FIG. 5A illustrates, by way of example, two four-dimensional trajectories generated by the system of FIG. 1 or the method of FIG. 2.
Figure 5B:
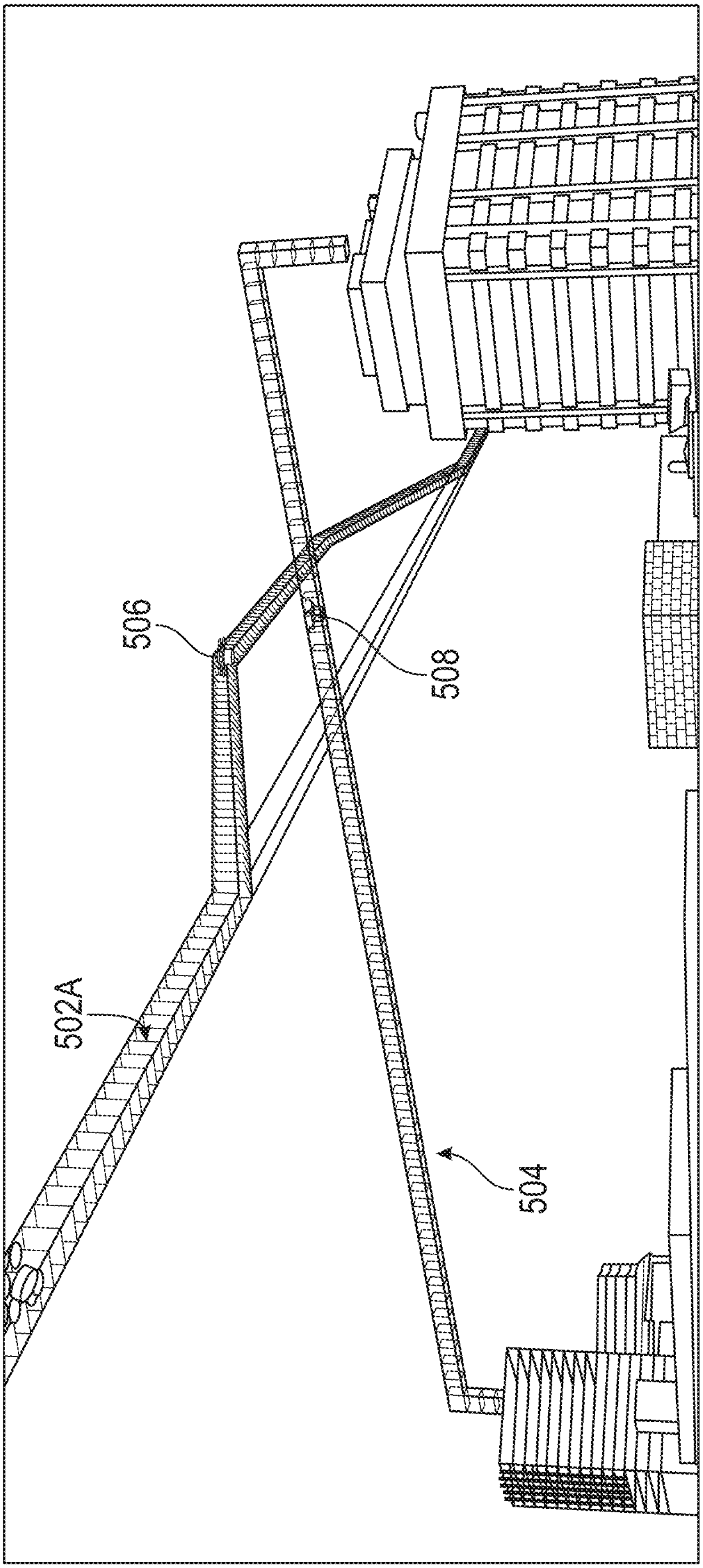
FIG. 5B illustrates, by way of example, rerouting of one of the two four-dimensional trajectories of FIG. 5A by the system of FIG. 1 or the method of FIG. 2 to avoid potential conflict with the other of the two four-dimensional trajectories of FIG. 5A.

FIG. 5A shows an example where two four-dimensional trajectories 502 and 504 for UAVs 506 and 508, respectively have been generated by the system 100 (FIG. 1) or the method 200 (FIG. 2). The two four-dimensional trajectories 502 and 504 are unacceptably close in proximity and time as verified through analysis by the system 100 (FIG. 1) or the method 200 (FIG. 2). This closeness in proximity and time is a conflict that must be resolved through rerouting of one of the two trajectories by the system 100 (FIG. 1) or the method 200 (FIG. 2). FIG. 5B shows an example of the rerouting of the UAV 506 along an updated (new) four-dimensional trajectory 502A that avoids the potential conflict with the four-dimensional trajectory 504 and the UAV 508.

Thus, the methods and systems discussed herein that take multiple flight intent inputs from many USS/PSUs together with constraints and airspace design configuration such as corridors and generates a four-dimensional trajectory to optimize airspace. In so doing, the methods and systems can input/receive data from UTM Service Supplier (USS) and AAM Provider of Services for Urban Air Mobility (UAM) (PSU) and conventional air traffic control such as multiple flight intent inputs together with constraints, flight restrictions and airspace design configuration. The methods and systems discussed herein aggregate the airspace picture from various sources. The system and methods take flight intent volumes, convert these intent volumes to center line routes, so these center line can be further processed. The systems and methods account for airspace restrictions (geo restrictions, Temporary Flight Restrictions (TFR) and aircraft performance parameters. This data is processed to generate four-dimensional trajectories that take the whole airspace into account and maximize the airspace volume resource, and better facilitate traffic flow management. The systems and methods can evaluate four-dimensional trajectories generated for conflict and constraint violation.

EXAMPLES AND NOTES

The present subject matter can be described by way of several examples.

Example 1 is a method simulating an airspace optionally including: receiving, with an electronically networked system, a plurality of flight intent data inputs from a plurality of sources including service suppliers of unmanned aircraft systems (UAS) traffic management (UTM), advanced air mobility (AAM) and conventional air traffic management (ATM), wherein the plurality of flight intent data inputs include, UTM flight intent volumes, UTM flight intent trajectories, conventional flight plans, conventional flight trajectories and an airspace design configuration; generating, with the electronically networked system, a center line route corresponding to each of the plurality of flight intent data inputs; generating, with the electronically networked system, a flight volume for each the plurality of flight intent data inputs; generating, with the electronically networked system, a four-dimensional trajectory based upon the center line route and the flight volume; and verifying, with the electronically networked system, the four-dimensional trajectory against constraints and potential conflicts.

In Example 2, the subject matter of Example 1 optionally includes, wherein the airspace design configuration includes airspace classes and airway corridors.

In Example 3, the subject matter of Example 2 optionally includes, wherein the constraints include aircraft-based constraints based upon an airline procedure model and an aircraft performance model.

In Example 4, the subject matter of Example 3 optionally includes, wherein the aircraft performance model includes aircraft characteristics including drag, lift, weight, thrust, fuel consumption, motion data and operation data including a phase of flight.

In Example 5, the subject matter of Example 4 optionally includes, wherein the constraints include geographic flight restrictions, temporary flight restrictions and weather conditions.

In Example 6, the subject matter of Example 5 optionally includes, wherein the verifying the four-dimensional trajectory includes simultaneously simulating all of the plurality of flight intent data inputs as a plurality of four-dimensional trajectories.

In Example 7, the subject matter of Example 6 optionally includes, wherein the verifying the four-dimensional trajectory includes evaluating the plurality of flight intent data inputs for the potential conflicts or violation of one or more constraints and further comprising notifying one or more of the service suppliers if one or more of the plurality of flight intent data inputs has been approved or disapproved based upon the potential conflicts or a violation of one or more of the constraints.

In Example 8, the subject matter of Example 7 optionally includes, issuing an alert to one or more of the service suppliers if the one or more of the plurality of flight intent data inputs has been disapproved; regenerating, with the electronically networked system, a second four-dimensional trajectory using a revised center line route and revised flight volume; and reverifying, with the electronically networked system, the second four-dimensional trajectory against constraints and potential conflicts.

In Example 9, the subject matter of Examples 1-8 optionally includes, receiving, with the electronically networked system, data including sensor data and aircraft telemetry data with the plurality of flight intent data inputs.

Example 10 is an electronically networked system for simulating an airspace optionally including: processing circuitry; and a memory that includes, instructions, the instructions, when executed by the processing circuitry, cause the processing circuitry to: receive a plurality of flight intent data inputs from a plurality of sources including service suppliers of unmanned aircraft systems (UAS) traffic management (UTM), advanced air mobility (AAM) and conventional air traffic management (ATM), wherein the plurality of flight intent data inputs include UTM flight intent volumes, UTM flight intent trajectories, conventional flight plans, conventional flight trajectories and an airspace design configuration; generate at least one four-dimensional trajectory by determining at least one center line route and determining at least one flight volume derived from at least one of the plurality of flight intent data inputs; evaluate the at least one four-dimensional trajectory against constraints and potential conflicts; and notify one or more of the service suppliers if the at least one of the plurality of flight intent data inputs has been approved or disapproved based upon a potential conflict or a violation of one or more of the constraints.

In Example 11, the subject matter of Example 10 optionally includes, wherein to evaluate the at least one four-dimensional trajectory includes simultaneously simulating all of the plurality of flight intent data inputs as a plurality of four-dimensional trajectories.

In Example 12, the subject matter of Example 11 optionally includes, wherein the instructions, when executed by the processing circuitry, cause the processing circuitry to: issue an alert to one or more of the service suppliers if at least one of the plurality of flight intent data inputs has been disapproved; regenerate a second four-dimensional trajectory with revised center line route and revised flight volume; and reverify the second four-dimensional trajectory against constraints and potential conflicts.

In Example 13, the subject matter of Example 12 optionally includes, wherein the airspace design configuration includes airspace classes and airway corridors.

In Example 14, the subject matter of Example 13 optionally includes, wherein the constraints include aircraft-based constraints based upon an airline procedure model and an aircraft performance model.

In Example 15, the subject matter of Example 14 optionally includes, wherein the aircraft performance model includes aircraft characteristics including drag, lift, weight, thrust, fuel consumption, motion data and operation data including a phase of flight.

In Example 16, the subject matter of Example 15 optionally includes, wherein the constraints include geographic flight restrictions, temporary flight restrictions and weather conditions.

In Example 17, the subject matter of Example 16 optionally includes, wherein the instructions, when executed by the processing circuitry, cause the processing circuitry to: receive data including sensor data and aircraft telemetry data with the plurality of flight intent data inputs.

Example 18 is a non-transitory computer readable storage device including instructions, which when executed by a machine, configure the machine to: receive plurality of flight intent data inputs from a plurality of sources including service suppliers of unmanned aircraft systems (UAS) traffic management (UTM), advanced air mobility (AAM) and conventional air traffic management (ATM), wherein the plurality of flight intent data inputs include, UTM flight intent volumes, UTM flight intent trajectories, conventional flight plans, conventional flight trajectories and an airspace design configuration; generate at least one four-dimensional trajectory by determining at least one center line route and determining at least one flight volume derived from one or more of the plurality of flight intent data inputs; evaluate the at least one four-dimensional trajectory against constraints and potential conflicts; and notify one or more of the service suppliers if the at least one of the plurality of flight intent data inputs has been approved or disapproved based upon a potential conflict or a violation of one or more of the constraints.

In Example 19, the subject matter of Example 18 optionally includes, wherein to evaluate the at least one four-dimensional trajectory includes simultaneously simulating all of the plurality of flight intent data inputs as a plurality of four-dimensional trajectories.

In Example 20, the subject matter of Example 19 optionally includes, wherein the airspace design configuration includes airspace classes and airway corridors, wherein the constraints include aircraft-based constraints based upon an airline procedure model and an aircraft performance model, wherein the aircraft performance model includes aircraft characteristics including drag, lift, weight, thrust, fuel consumption, motion data and operation data including a phase of flight, wherein the constraints include geographic flight restrictions, temporary flight restrictions and weather conditions.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

The above Description of Embodiments includes references to the accompanying drawings, which form a part of the detailed description. The drawings show, by way of illustration, specific embodiments in which methods, apparatuses, and systems discussed herein can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

The flowchart and block diagrams in the FIGS. illustrate the architecture, functionality, and operation of possible implementations of systems, methods and computer program products according to various aspects of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The functions or processes described herein can be implemented in software, hardware, human implemented procedures, or a combination thereof. The software can consist of computer executable instructions stored on computer readable media such as memory or other type of storage devices. The term "computer readable media" is also used to represent any means by which the computer readable instructions can be received by the computer, such as by different forms of wired or wireless transmissions. Further, such functions correspond to modules, which are software, hardware, firmware or any combination thereof. Multiple functions can be performed in one or more modules as desired, and the embodiments described are merely examples. The software can be executed on a digital signal processor, ASIC, microprocessor, or other type of processor operating on a computer system, such as a personal computer, server or other computer system.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Description of Embodiments, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Description of Embodiments as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method simulating an airspace comprising:

receiving, with an electronically networked system, a plurality of flight intent data inputs from a plurality of sources including service suppliers of unmanned aircraft systems (UAS) traffic management (UTM), advanced air mobility (AAM) and conventional air traffic management (ATM), wherein the plurality of flight intent data inputs include UTM flight intent volumes, UTM flight intent trajectories, conventional flight plans, conventional flight trajectories and an airspace design configuration;

generating, with the electronically networked system, a center line route corresponding to each of the plurality of flight intent data inputs;

generating, with the electronically networked system, a flight volume for each the plurality of flight intent data inputs;

generating, with the electronically networked system, a four-dimensional trajectory based upon the center line route and the flight volume;

verifying, with the electronically networked system, the four-dimensional trajectory against constraints and potential conflicts, wherein the verifying the four-dimensional trajectory includes simultaneously simulating all of the plurality of flight intent data inputs as a plurality of four-dimensional trajectories;

issuing an alert to one or more of the service suppliers if the one or more of the plurality of flight intent data inputs has been disapproved;

regenerating, with the electronically networked system, a second four-dimensional trajectory using a revised center line route and revised flight volume; and reverifying, with the electronically networked system, the second four-dimensional trajectory against constraints and potential conflicts.

2. The method of claim 1, wherein the airspace design configuration includes airspace classes and airway corridors.

3. The method of claim 2, wherein the constraints include aircraft-based constraints based upon an airline procedure model and an aircraft performance model.

4. The method of claim 3, wherein the aircraft performance model includes aircraft characteristics including drag, lift, weight, thrust, fuel consumption, motion data and operation data including a phase of flight.

5. The method of claim 4, wherein the constraints include geographic flight restrictions, temporary flight restrictions and weather conditions.

6. The method of claim 1, wherein the verifying the four-dimensional trajectory includes evaluating the plurality of flight intent data inputs for the potential conflicts or violation of one or more constraints and further comprising notifying one or more of the service suppliers if one or more of the plurality of flight intent data inputs has been approved or disapproved based upon the potential conflicts or a violation of one or more of the constraints.

7. The method of claim 1, further comprising receiving, with the electronically networked system, data including sensor data and aircraft telemetry data with the plurality of flight intent data inputs.

8. A method simulating an airspace comprising:

receiving, with an electronically networked system, a plurality of flight intent data inputs from a plurality of sources including service suppliers of unmanned aircraft systems (UAS) traffic management (UTM), advanced air mobility (AAM) and conventional air traffic management (ATM), wherein the plurality of flight intent data inputs include UTM flight intent volumes, UTM flight intent trajectories, conventional flight plans, conventional flight trajectories and an airspace design configuration, wherein the airspace design configuration includes airspace classes and airway corridors;

generating, with the electronically networked system, a center line route corresponding to each of the plurality of flight intent data inputs;

generating, with the electronically networked system, a flight volume for each the plurality of flight intent data inputs;

generating, with the electronically networked system, a four-dimensional trajectory based upon the center line route and the flight volume; and verifying, with the electronically networked system, the four-dimensional trajectory against constraints and potential conflicts, wherein the constraints include aircraft-based constraints based upon an airline procedure model and an aircraft performance model, wherein the constraints include geographic flight restrictions, temporary flight restrictions and weather conditions, wherein the aircraft performance model includes aircraft characteristics including drag, lift, weight, thrust, fuel consumption, motion data and operation data including a phase of flight;

wherein the verifying the four-dimensional trajectory includes simultaneously simulating all of the plurality of flight intent data inputs as a plurality of four-dimensional trajectories;

wherein the verifying the four-dimensional trajectory includes evaluating the plurality of flight intent data inputs for the potential conflicts or violation of one or more constraints and further comprising notifying one or more of the service suppliers if one or more of the plurality of flight intent data inputs has been approved or disapproved based upon the potential conflicts or a violation of one or more of the constraints;

issuing an alert to one or more of the service suppliers if the one or more of the plurality of flight intent data inputs has been disapproved;

regenerating, with the electronically networked system, a second four-dimensional trajectory using a revised center line route and revised flight volume; and reverifying, with the electronically networked system, the second four-dimensional trajectory against constraints and potential conflicts.

9. An electronically networked system for simulating an airspace comprising:

processing circuitry; and a memory that includes instructions, the instructions, when executed by the processing circuitry, cause the processing circuitry to:

receive a plurality of flight intent data inputs from a plurality of sources including service suppliers of unmanned aircraft systems (UAS) traffic management (UTM), advanced air mobility (AAM) and conventional air traffic management (ATM), wherein the plurality of flight intent data inputs include UTM flight intent volumes, UTM flight intent trajectories, conventional flight plans, conventional flight trajectories and an airspace design configuration;

generate at least one four-dimensional trajectory by determining at least one center line route and determining at least one flight volume derived from at least one of the plurality of flight intent data inputs;

evaluate the at least one four-dimensional trajectory against constraints and potential conflicts, wherein to evaluate the at least one four-dimensional trajectory includes simultaneously simulating all of the plurality of flight intent data inputs as a plurality of four-dimensional trajectories; and notify one or more of the service suppliers if the at least one of the plurality of flight intent data inputs has been approved or disapproved based upon a potential conflict or a violation of one or more of the constraints;

wherein the instructions, when executed by the processing circuitry, cause the processing circuitry to:

issue an alert to one or more of the service suppliers if at least one of the plurality of flight intent data inputs has been disapproved;

regenerate a second four-dimensional trajectory with revised center line route and revised flight volume; and reverify the second four-dimensional trajectory against constraints and potential conflicts.

10. The system of claim 9, wherein the airspace design configuration includes airspace classes and airway corridors.

11. The system of claim 10, wherein the constraints include aircraft-based constraints based upon an airline procedure model and an aircraft performance model.

12. The system of claim 11, wherein the aircraft performance model includes aircraft characteristics including drag, lift, weight, thrust, fuel consumption, motion data and operation data including a phase of flight.

13. The system of claim 12, wherein the constraints include geographic flight restrictions, temporary flight restrictions and weather conditions.

14. The system of claim 13, wherein the instructions, when executed by the processing circuitry, cause the processing circuitry to:

receive data including sensor data and aircraft telemetry data with the plurality of flight intent data inputs.

* * * * *